(12) United States Patent
Funabashi et al.

(10) Patent No.: US 7,561,765 B2
(45) Date of Patent: Jul. 14, 2009

(54) OPTICAL INTEGRATED CIRCUIT AND OPTICAL INTEGRATED CIRCUIT MODULE

(75) Inventors: Masaki Funabashi, Tokyo (JP); Junichi Hasegawa, Tokyo (JP); Takeshi Akutsu, Tokyo (JP); Kazutaka Nara, Tokyo (JP); Noriyuki Yokouchi, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 12/045,281

(22) Filed: Mar. 10, 2008

(65) Prior Publication Data

US 2008/0240645 A1   Oct. 2, 2008

(30) Foreign Application Priority Data

Mar. 30, 2007   (JP)   ............................. 2007-091594

(51) Int. Cl.
G02B 6/12   (2006.01)
(52) U.S. Cl. ......................................... 385/14; 385/131
(58) Field of Classification Search ....................... None
See application file for complete search history.

(56) References Cited

U.S. PATENT DOCUMENTS 6,483,968 B2 * 11/2002 Fuse et al. .................... 385/49
7,215,852 B2 * 5/2007 Doerr et al. ................... 385/46
7,352,924 B2 * 4/2008 Gaebe et al. .................. 385/14

FOREIGN PATENT DOCUMENTS

JP   10-227936   8/1998
JP   2001-267684   9/2001

OTHER PUBLICATIONS

I. Ogawa, et al., "Lossless Hybrid Integrated 8-ch Optical Wavelength Selector Module Using PLC Platform and PLC-PLC Direct Attachment Techniques", 1998, pp. PD4-1-PD4-4.
U.S. Appl. No. 12/045,281, filed Mar. 10, 2008, Funabashi, et al.
U.S. Appl. No. 12/041,231, filed Mar. 3, 2008, Hasegawa, et al.
U.S. Appl. No. 12/056,892, filed Mar. 27, 2008, Nara.

* cited by examiner

*Primary Examiner*—Omar Rojas
(74) *Attorney, Agent, or Firm*—Oblon, Spivak, McClelland, Maier & Neustadt, P.C.

(57) ABSTRACT

An optical integrated circuit 1 according to the present invention includes a planar lightwave circuit 2, and a semiconductor element 3, which are fixed at one contact surface 12. A semiconductor optical amplifier (SOA) 9 is formed on a semiconductor substrate 8. A semiconductor waveguide 10 and a semiconductor waveguide 11 are formed on an input side and an output side of SOA 9, respectively. The semiconductor waveguide 11 has a turnaround portion 11*a* turned around on the semiconductor substrate 8. Respective ends of the optical waveguides 5 and 6 on a PLC platform 4 and respective ends of semiconductor waveguides 10 and 11 are optically coupled with each other at the contact surface 12.

6 Claims, 5 Drawing Sheets

OPTICAL INTEGRATED CIRCUIT AND OPTICAL INTEGRATED CIRCUIT MODULE

BACKGROUND OF THE INVENTION

1) Field of the Invention

The present invention relates to an optical integrated circuit formed by interconnecting a plurality of optical components, and more specifically, relates to an optical circuit and an optical integrated circuit module. In the optical integrated circuit module, optical hybrid integrated devices, in which a planar lightwave circuit having optical waveguides formed on a PLC platform, and a semiconductor device having optical active components, such as semiconductor laser diodes and semiconductor photodiodes formed on a semiconductor substrate are coupled with each other.

2) Description of the Related Art

With the spread and progress of optical communication networks, functions of optical components for use in optical transmission systems have been sophisticated. The optical components include optical active components for emitting or receiving optical signals, optical passive components for splitting/coupling or demultiplexing/multiplexing the optical signals, optical fibers for use in transmission lines of the optical signals, or the like, and an improvement in performance or a reduction in cost is increasingly required for respective optical components. Among these, with regard to the optical active components, devices based on semiconductor materials, such as semiconductor lasers and semiconductor photodiodes are the main devices, and technical development thereof has been advanced. The optical active component based on the semiconductor material has features of allowing optical amplification function, high-speed operation, and compact integration. Meanwhile, with regard to the optical passive components, planar lightwave circuits (PLC; Planar Lightwave Circuit, which will be referred to PLC hereinbelow) having optical waveguides based on silica-based materials are commercially produced. PLC has advantageous features of allowing optical waveguides to realize with low loss and without polarization dependency.

While improvement in performance of respective elements has been independently made for both the optical active element and the optical passive element until now, requirement for high performance optical components having both advantages has been increased because of sophisticated needs resulting from development of the optical transmission systems. Therefore, developments of optical hybrid integrated devices in which semiconductor active elements (optical active component) such as semiconductor laser diodes or the like, and PLC are combined with each other have been made.

In a conventional art disclosed in, for example, Patent Document 1, a semiconductor laser diode is hybrid-mounted on the PLC platform, and thus achieving a laser that oscillates in an external resonator mode which is formed between the semiconductor laser diode and a UV grating on the PLC. In this conventional art, there is only one waveguide for introducing a light outputted from the semiconductor laser diode into the UV grating. Therefore, one end facet of the emitting waveguide (a semiconductor waveguide on the Si terrace for mounting the laser diode) of the semiconductor laser diode and one end facet of the optical waveguide on the PLC are coupled with each other.

Document 1: Japanese Unexamined Patent Publication (Kokai) No. 2001-267684

Meanwhile, in a conventional art disclosed in following Document 2, an optical wavelength selector is achieved by hybrid-integrating an arrayed waveguide grating (AWG) on the PLC and semiconductor optical amplifiers (SOAs). Here, SOAs are used as gate switches, wherein input waveguides and output waveguides of SOAs are in contact with different end facets of the semiconductor substrate, and in contact with the PLC platform at respective end facets to optically couple with the optical waveguides on the PLC platform.

Document 2: I. Ogawa, F. Ebisawa, N. Yoshimoto, K. Takiguchi, F. Hanawa, T. Hashimoto, A. Sugita, M. Yanagisawa, Y. Inoue, Y. Yamada, Y. Tohmori, S. Mino, T. Ito, K. Magari, Y. Kawaguchi, A. Himeno, and K. Kato, "Lossless hybrid integrated 8-ch optical wavelength selector module using PLC platform and PLC-PLC direct attachment techniques" Proc. OFC' 98, 1998, paper PD4-1

Moreover, in following Document 3, there is disclosed a technology in which waveguides on different PLC platforms (a first PLC platform and a second PLC platform) are optically coupled with each other. In this conventional art, the waveguides on one PLC has a turnaround portion. However, since it is difficult to achieve a high refractive index difference in PLC, there is no choice other than setting a radius of curvature of the bent waveguide in the turnaround portion to a quite large value.

Document 3: Japanese Unexamined Patent Publication (Kokai) No. H10-227936

However, when the semiconductor element, such as a SOA having the input waveguide and the output waveguide, and the optical waveguides on right and left PLCs existing on both sides of the semiconductor element are coupled with each other as the conventional art disclosed in aforementioned Document 2, following fixing is required. Namely, one end facet of the semiconductor substrate with the end of the input waveguides is fixed to the end facet of one PLC platform, and the other end facet of the semiconductor substrate with the end of the output waveguides is also fixed to the end facet of the other PLC platform. As a result, the input waveguides of the semiconductor elements are coupled with the optical waveguides of one PLC, and the output waveguides thereof are coupled with the optical waveguides of the other PLC. As described above, the number of surfaces (contact surfaces) for fixing the semiconductor substrate which has the input waveguides and the output waveguides and on which the semiconductor elements is formed, and the PLC platform is increased. In this case, it is necessary to obtain excellent couplings between the waveguide on the semiconductor substrate and the optical waveguides on the right and left PLC platforms at respective contact surfaces. For this reason, in the conventional art described in aforementioned Document 2, optical alignment works between the waveguides must be performed at two contact surfaces. One of two contact surfaces is a contact surface between one end facet of the semiconductor substrate and the end facet of one PLC platform, and another is a contact surface between the other end facet of the semiconductor substrate and the end facet of the other PLC platform, respectively. Hence, since the man-hour for alignment increases in this conventional art, the optical alignment works will be troublesome and take time, and a possibility that alignment mistakes may occur will also be increased. As a result, there has been a problem of difficulty in obtaining the excellent coupling efficiency.

Meanwhile, it is conceivable to insert the semiconductor elements into an area (cutout portion) where a part of the optical waveguides on the one PLC platform is cut off, and then arrange it. However, even in this case, there have been problems that a dimensional accuracy to a length of the cutout portion or the semiconductor element would be severe, or the optical alignment works would be complicated and difficult, in order to make the coupling efficiency between the input side and the output side waveguides of the semiconductor element, and the optical waveguides on the PLC platform excellent.

Further, when those hybrid-integrated circuit of the semiconductor element and PLC platforms is modularized with fiber pigtails or fiber arrays, the optical alignment works between the PLC platforms and the fibers need to be performed at two points of the end facets of the PLC platforms and the man-hour for alignment increases by that much. As a result, the optical alignment works will be troublesome and time consuming, and the possibility that optical alignment mistakes may occur will also be increased, thus causing the problem of difficulty in obtaining the excellent coupling efficiency.

SUMMARY OF THE INVENTION

The present invention is made in view of the above-mentioned conventional problems. The present invention has an object provide a compact optical integrated circuit and a compact optical integrated circuit module of a planar lightwave circuit and a semiconductor element, in which optical alignment works are easily performed and excellent coupling efficiency is easily obtained.

An optical integrated circuit in accordance with a first aspect of the present invention is provided with a planar lightwave circuit in which an optical waveguide is formed on a first substrate; and a semiconductor element in which at least one element having a semiconductor waveguide is formed on a second substrate, wherein the planar lightwave circuit and the semiconductor element are fixed at one contact surface, and an end of the optical waveguide and an end of the semiconductor waveguide are optically coupled with each other at the contact surface.

According to this aspect, since the contact surface between the planar lightwave circuit and the semiconductor element, namely, the contact surface between the first substrate of the planar lightwave circuit and the second substrate of the semiconductor element results in only one contact surface, optical alignment works for coupling both of them can be performed at once. For this reason, the man-hour for alignment can be reduced, the optical alignment works can be easily performed, and a possibility that alignment mistakes may occur will also be reduced, thereby allowing excellent coupling efficiency to be obtained. Additionally, since input/output fibers may also be in contact with the planar lightwave circuit only at an end facet of one side thereof, it is also possible to reduce optical alignment works of this portion. Further, there are also advantages that strict dimensional accuracy against a length of the semiconductor element or the like is not required, either.

The "planar lightwave circuit (PLC)" described here means a circuit in which the optical waveguide is formed with materials of a quartz system or a polymer system on the substrate of silicon or quartz by combining optical fiber manufacturing technologies and semiconductor microfabrication technologies.

In the optical integrated circuit in accordance with a second aspect of the present invention, input semiconductor waveguide and output semiconductor waveguide are formed at an input side and an output side of the semiconductor element, respectively, one of the input and the output semiconductor waveguides has a turnaround portion turned around on the second substrate, and an end of the input semiconductor waveguide and an end of the output semiconductor waveguide are optically coupled with an end of the input side optical waveguide and an end of the output side optical waveguide formed on the first substrate at the contact surface, respectively.

A refractive index difference between a core and a clad composing this optical waveguide is typically less than or comparable to several percents in the optical waveguide of the planar lightwave circuit of a normal quartz system. The refractive index difference between the core and the clad composing this optical waveguide may be set to a large value of more than 10% in the semiconductor waveguide. The larger the refractive index difference between the core and the clad, the smaller the radius of curvature of the turnaround portion at the time of turning around the waveguide (bent waveguide) can be made. For that reason, fabricating the turnaround waveguide on the semiconductor makes it possible to greatly reduce the size of the element as compared with a case where the turnaround waveguide is fabricated on the planar lightwave circuit of the quartz system.

According to the second aspect, while one of the input and output semiconductor waveguides of the element has the turnaround portion turned around on the second substrate, the radius of curvature of the turnaround portion can be reduced in the semiconductor waveguide, thus allowing the size of the semiconductor element to be greatly reduced. Hence, the compact optical integrated circuit in which the planar lightwave circuit and the semiconductor device are integrated can be achieved.

In contract to this, the conventional art disclosed in aforementioned Document 3 has a configuration in which the waveguides on the first PLC platform and the second PLC platform are coupled with each other, and the waveguide is turned around on any one of the PLC platforms. Since it is difficult to achieve the waveguide with high refractive index difference in the optical waveguide on the PLC quartz system as compared with the semiconductor waveguide, there is no choice other than setting the radius of curvature of the turnaround portion of the bent waveguide to a quite large value.

Moreover, according to the second aspect, the end of the input semiconductor waveguide and the end of the output semiconductor waveguide of the element are coupled with the different optical waveguides at the contact surface. Hence, the contact surface between the semiconductor element and the planar lightwave circuit results in only one contact surface, although there are the input and the output semiconductor waveguides of the element. For this reason, the optical alignment works for coupling the optical waveguides on the planar lightwave circuit and the semiconductor waveguides on the semiconductor element can be performed at once.

Note herein that, the "element" described herein includes for example, Semiconductor Optical Amplifiers (SOA), Electro Absorption (=EA) modulators using the electric field absorption effect of the semiconductor, semiconductor lasers, semiconductor photo detectors, or the like.

In the optical integrated circuit in accordance with a third aspect of the present invention, a plurality of elements having the semiconductor waveguides are arranged in array pattern.

According to this aspect, even when the optical integrated circuit is fabricated by integrating the semiconductor device in which a plurality of elements are arranged in array pattern, and the planar lightwave circuit, the optical alignment works are easily performed and excellent coupling efficiency can also be obtained.

In the optical integrated circuit in accordance with a fourth aspect of the present invention, ends of all the semiconductor waveguides formed on the second substrate and ends of all the optical waveguides formed on the first substrate are optically coupled with each other at the contact surface.

According to this aspect, although there are many waveguides coupled at the contact surface, the planar lightwave circuit and the semiconductor device are made contact with each other at one contact surface to be fixed, so that it is possible to perform the alignment and fixing works of the planar lightwave circuit and the semiconductor device at once.

In the optical integrated circuit in accordance with a fifth aspect of the present invention, RF electrodes for supplying RF signals to the elements are formed on the second substrate.

In the optical integrated circuit in accordance with a sixth aspect of the present invention, the element having the semiconductor waveguide is a semiconductor light receiving element in which the input semiconductor waveguide is formed only on the input side thereof, the end of the input semiconductor waveguide is optically coupled with the optical waveguide at the contact surface, a first optical waveguide for alignment and a second optical waveguide for alignment are formed on the first substrate for guiding a light for alignment, a turnaround waveguide for alignment is formed on the second substrate, and a light emitting end of the first optical waveguide for alignment and a light incident end of the second optical waveguide for alignment are optically coupled with a light incident end and a light emitting end of the turnaround waveguide for alignment at the contact surface, respectively.

In the optical integrated circuit in accordance with a seventh aspect of the present invention, the elements are arranged in array pattern.

In the optical integrated circuit in accordance with an eighth aspect of the present invention, the element having the semiconductor waveguide is a semiconductor light emitting element in which the output semiconductor waveguide is formed only on the output side, and the end of the output semiconductor waveguide is optically coupled with the end of the optical waveguide at the contact surface.

An optical integrated circuit module in accordance with the present invention is provided with the above-mentioned optical integrated circuit, and optical fibers for input/output arranged at an end facet opposite to the contact surface of the first substrate, wherein ends of the optical fibers for input/output are optically coupled with the optical waveguides on the first substrate.

BRIEF DESCRIPTION OF THE DRAWINGS

The above and other objects and features of the invention will appear more fully hereinafter from a consideration of the following description taken into connection with the accompanying drawing wherein one example is illustrated by way of example, in which.

DETAILED DESCRIPTION

Figure 1:
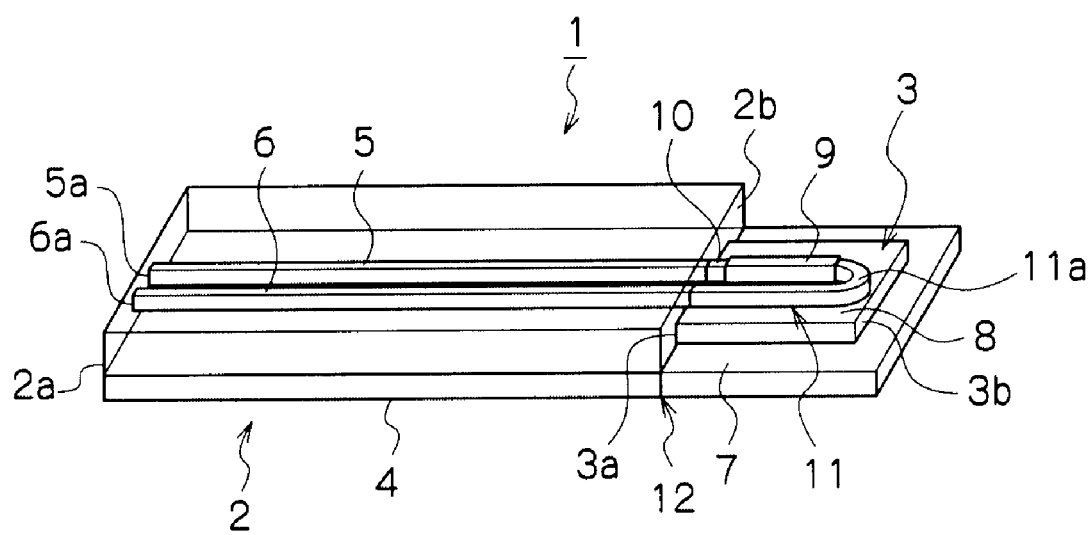
FIG. 1 is a perspective view showing a basic configuration of an optical integrated circuit in accordance with a first embodiment.

Hereinafter, each of embodiments of an optical integrated circuit and an optical integrated circuit module that embody the present invention will be described based on the drawings. Incidentally, in the description of each embodiment, the same reference numeral is given to a similar part and a duplicated description will be omitted.

First Embodiment

Figure 2:
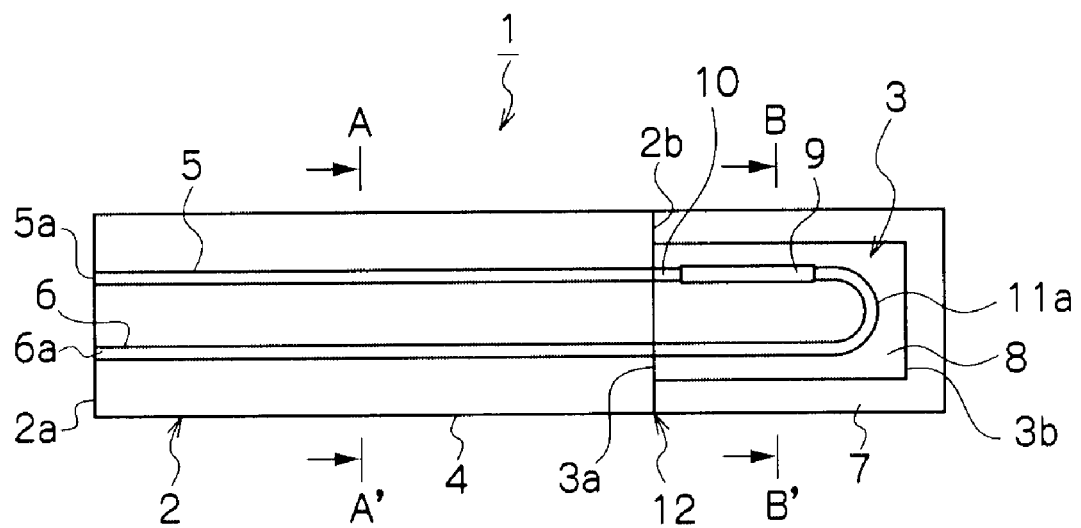
FIG. 2 is a plan view showing the optical integrated circuit in accordance with the first embodiment.
Figure 3:
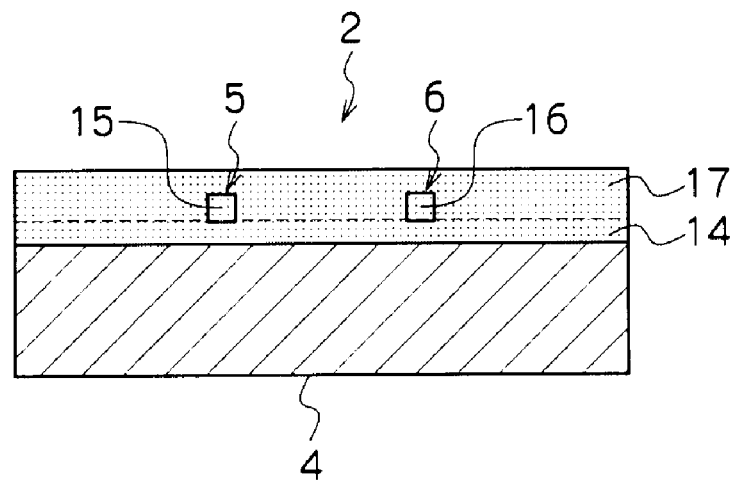
FIG. 3 is a sectional view along a line A-A' shown in FIG. 2.
Figure 4:
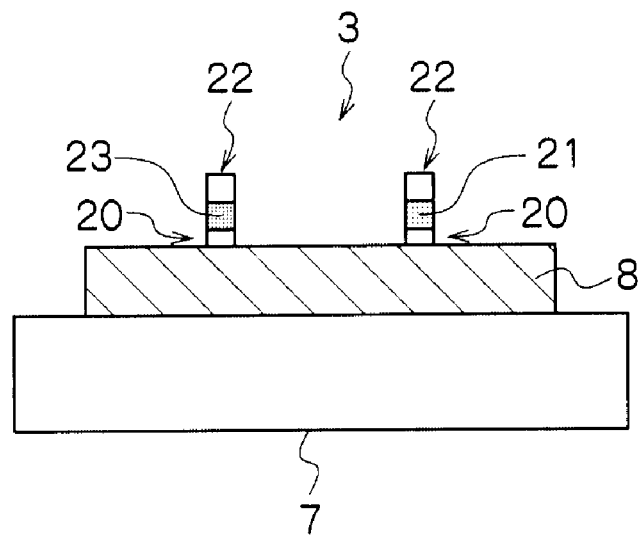
FIG. 4 is a sectional view along a line B-B' line shown in FIG. 2.

An optical integrated circuit in accordance with a first embodiment of the present invention will be described based on FIG. 1 through FIG. 4. FIG. 1 is a conceptual diagram showing a basic configuration of the optical integrated circuit in accordance with the first embodiment, while FIG. 2 is a plan view showing the same optical integrated circuit. FIG. 3 is a sectional view along a line A-A' shown in FIG. 2, and shows a cross-sectional structure of the planar lightwave circuit. Meanwhile, FIG. 4 is a sectional view along a line B-B' shown in FIG. 2, and shows a cross-sectional structure of a semiconductor waveguide portion of a semiconductor element.

An optical integrated circuit 1 is a circuit in which a planar lightwave circuit (PLC) 2 and a semiconductor element 3 fixed on a silicon substrate 7 are integrated as shown in FIG. 1 and FIG. 2.

The planar lightwave circuit 2 is provided with a PLC platform 4 and two straight optical waveguides 5 and 6 formed on the PLC platform 4. The optical waveguides 5 and 6 are extended from one end facet 2a to the other end facet 2b of the planar lightwave circuit 2, respectively. Namely, one ends of the optical waveguides 5 and 6 are in contact with one end facet (left side end facet in FIG. 1) of the PLC platform 4, respectively, and the other ends thereof are in contact with the other end facet (right side end facet in FIG. 1) of the PLC platform 4, respectively. The PLC platform 4 is a silicon substrate, for example.

The semiconductor element 3 is provided with a semiconductor substrate 8, and a semiconductor optical amplifier (SOA) 9 as an element formed on this semiconductor substrate 8 as shown in FIG. 1 and FIG. 2. An input semiconductor waveguide 10 and an output semiconductor waveguide 11 are further formed on the semiconductor substrate 8 at an input side and an output side of the semiconductor amplifier 9, respectively. The output semiconductor waveguide 11 has a turnaround portion 11a turned around on the semiconductor substrate 8 where a propagating direction of a light is turned around, and is in contact with an end facet 3a of the semiconductor element 3 on the same side as the input semiconductor waveguide 10.

The optical integrated circuit 1 is characterized by following configurations.

The planar lightwave circuit 2 and the semiconductor element 3 are fixed at one contact surface 12. Namely, the other end facet 2b of the planar lightwave circuit 2 and the end facet 3a of the semiconductor element 3 are fixed.

The element formed on the semiconductor substrate 8 is the semiconductor optical amplifier (SOA) 9.

The input semiconductor waveguide 10 and the output semiconductor waveguide 11 are formed on the input side and the output side of the semiconductor amplifier 9, respectively. The output semiconductor waveguide 11 has the turnaround portion 11a turned around on the semiconductor substrate 8.

Respective ends of the optical waveguides 5 and 6 and respective ends of semiconductor waveguides 10 and 11 are coupled with each other on one contact surface 12. Namely, the end of the optical waveguide 5 and the end of the optical waveguide 6 are coupled with the end of the input semiconductor waveguide 10 and the end of the output semiconductor waveguide 11 on one contact surface 12, respectively.

The planar lightwave circuit 2 is composed of the PLC platform 4, a lower clad layer 14 formed on the PLC platform 4, core layers 15 and 16 formed on the lower clad layer 14, and an upper clad layer 17 formed on the lower clad layer 14 and the core layers 15 and 16, as shown in FIG. 3. In the planar lightwave circuit 2 composed as above, the optical waveguides 5 and 6 is composed of the core layers 15 and 16 with high refractive index serving as paths of the light, and the clad layers 14 and 17 with low refractive index, which are peripheries thereof. As an example, the optical waveguides 5 and 6 are quartz glass waveguides in which the lower clad layer 14, the core layers 15 and 16, and the upper clad layer 17 are formed with quartz system materials in the present embodiment. In the optical waveguides 5 and 6 described above, a refractive index difference between the core layers 15 and 16, and the clad layers 14 and 17 is typically less than or comparable to several percents.

The aforementioned planar lightwave circuit 2 is formed by following methods. Glass particles to be the lower clad layer 14 and the core layers 15 and 16 are deposited on the PLC platform (for example, silicon substrate) 4 by a flame hydrolysis deposition (FHD) method which is an application of optical fiber fabrication technologies, and are melted by heating to make a glass membrane transparent. Subsequently, a desired optical waveguide pattern is formed by photolithography and reactive ion etching (RIE), which are semiconductor integrated circuit manufacturing technologies, and the upper clad layer 17 is formed by the FHD method again.

The input semiconductor waveguide 10 and the output semiconductor waveguide 11 formed on the semiconductor substrate 8 are provided with lower clad layers 20 formed on the semiconductor substrate 8, core layers 21 formed on the lower clad layers 20, and upper clad layers 22 formed on the core layers 21, respectively, as shown in FIG. 4. The semiconductor substrate 8 is formed of a compound semiconductor InP; the lower clad layer 20, a compound semiconductor InP; the core layer 21, compound semiconductor InGaAsP; and the upper clad layer 22, a compound semiconductor InP, respectively. Additionally, the semiconductor waveguide 10 is a straight waveguide formed into a high mesa structure. The semiconductor waveguide 11 is a waveguide, which is formed into a high mesa structure and has the turnaround portion 11a. The semiconductor waveguides may have an embedded structure and a low mesa structure. In the case of forming the semiconductor waveguides into the high mesa structure as the present example, a refractive index difference between the core layer 21 and air on both sides is significantly large, for example, 40% or more. Therefore, low loss can be maintained even when a radius of curvature of the turnaround portion 11a is decreased.

The semiconductor optical amplifier 9 formed on the semiconductor substrate 8 differs in a configuration from the semiconductor waveguides 10 and 11 in that the core layer of the semiconductor waveguides 10 and 11 is an active layer 23 formed by an optical amplification medium. The semiconductor optical amplifier 9 and the semiconductor waveguides 10 and 11 are then formed on the semiconductor substrate 8 so that the light transmitted within the core layer 21 of the semiconductor waveguide 10 may pass through the active layer 23 of the semiconductor optical amplifier 9 and the core layer 21 of the semiconductor waveguide 11. In the present embodiment, the semiconductor optical amplifier 9 is used as a semiconductor gate in which an incident light is turned on and off by turning on and off an injection current. The optical integrated circuit 1 having the aforementioned configuration is fabricated as follows.

The planar lightwave circuit 2 and the semiconductor element 3 are made contact with each other at one contact surface 12. Namely, the other end facet 2b of the planar lightwave circuit 2 and the end facet 3a of the semiconductor element 3 are made contact with each other. In this state, an optical alignment between the optical waveguide 5 and the input semiconductor waveguide 10 and an optical alignment between the optical waveguide 6 and the output semiconductor waveguide 11 are performed. An active alignment is employed as the optical alignment method, in which a light for alignment is entered into the optical waveguide 5 from an incident port 5a side of the optical waveguide 5 in a state where currents are made to flow through the semiconductor optical amplifier 9 on the semiconductor substrate 8, a light which has passed through the semiconductor waveguide 10, the semiconductor optical amplifier 9, the semiconductor waveguide 11, and the optical waveguide 6, and emitted from an emitting port 6a is received by a light receiving element (not shown), and alignment between the planar lightwave circuit 2 and the semiconductor element 3 is performed so that the amount of light to be received may be the maximum level.

Note herein that, although the alignment by the active alignment is performed in the present embodiment, it is also possible to perform passive alignment by utilizing position markers, concavo-convex shapes for alignment, or the like formed on the PLC platform 4 and the semiconductor substrate 8.

Since a thickness of the semiconductor substrate 8 is thin, compared with that of the PLC platform 4, the semiconductor element 3 on the semiconductor substrate 8 is fixed on the silicon substrate 7, and the PLC platform 4 and the silicon substrate 7 are then attached, so that sufficient attachment strength is ensured in the present embodiment.

Meanwhile, the spot size of the optical waveguide on the PLC generally differs from that of the semiconductor waveguide. A structure for converting the spot size is provided in the portion where both of the waveguides are coupled with each other to thereby adjust the spot sizes of the optical waveguide and the semiconductor waveguide, thus allowing further higher coupling efficiency to be obtained.

According to the first embodiment having the above configuration, following functions and effects can be obtained.

The contact surface 12 between the planar lightwave circuit 2 and the semiconductor element 3, namely, the contact surface between the PLC platform (first substrate) 4 of the planar lightwave circuit 2 and the semiconductor substrate 8 (second substrate) of the semiconductor element 3 results in only one contact surface. By this construction, optical alignment works for coupling both of them can be performed at once. For this reason, the man-hour for alignment can be reduced, the optical alignment works can be easily performed, and a possibility that alignment mistakes may occur will also be reduced, thereby allowing excellent coupling efficiency to be obtained. Hence, it is possible to achieve the compact optical integrated circuit 1 in which the optical alignment works can be easily performed and the excellent coupling efficiency can be easily obtained, and the planar lightwave circuit 2 and the semiconductor device 3 are integrated.

Since the planar lightwave circuit 2 and the semiconductor element 3 are fixed at one contact surface 12, the alignment and fixing works of the planar lightwave circuit 2 and the semiconductor element 3 can also be performed at once, so that it is advantageous in the viewpoint of a reduction in fabrication time and a cost reduction.

The end of the input semiconductor waveguide 10 and the end of the output semiconductor waveguide 11 of the semiconductor optical amplifier (element) 9 are coupled with the different optical waveguides 5 and 6 at the contact surface 12. By this construction, the contact surface 12 between the semiconductor element 3 and the planar lightwave circuit 2 results in only one contact surface, although there are the input and the output semiconductor waveguides of the semiconductor optical amplifier 9, respectively. For this reason, the optical alignment works for coupling the optical waveguides 5 and 6 of the planar lightwave circuit 2, and the semiconductor waveguides 10 and 11 of the semiconductor element 3 can be performed at once.

Since input/output fibers are also in contact with the planar lightwave circuit 2 only at the end facet (one end facet 2a of the planar lightwave circuit 2) on one side, it is also possible to reduce the optical alignment works of this portion.

Since the semiconductor element 3 is fixed with the other end facet 2b of the planar lightwave circuit 2 only at the end facet 3a of one side thereof, an end facet 3b opposite to the end facet 3a of the semiconductor element 3 is free. For this reason, strict dimensional accuracy against a length of the semiconductor element 3 or the like is not required, either. Hence, fabrication of the semiconductor element 3 becomes easy.

The output semiconductor waveguide 11 has the high mesa structure and the refractive index difference between the core and the clad is as very large as 40% or more. By this construction, it is possible to suppress the loss to a low level even when the semiconductor waveguide 11 is turned around with a very small radius of curvature (for example, radius of curvature of about 125 micrometers). Since the output semiconductor waveguide 11 of the semiconductor optical amplifier 9 has the turnaround portion 11a turned around on the semiconductor substrate 8, the radius of curvature of the turnaround portion 11a can be reduced, thus allowing a size of the semiconductor element 3 to be greatly reduced. Hence, the compact optical integrated circuit in which the planar lightwave circuit 2 and the semiconductor element 3 are integrated can be achieved.

Anti-reflection coating for suppressing a reflection at the end facet to a low level is often applied to the end facet of the semiconductor waveguide. The coating is required for respective end facets (3a and 3b shown in FIG. 2) on the input side and the output side if the waveguide is not turned around. In the present embodiment, both of the ends of the input and output waveguides face to the same end facet 3a by turning around the waveguide. And thus, the anti-reflection coating may also be applied only to one side (only the end facet 3a), resulting in simple fabrication steps of the semiconductor element.

When the optical coupling from the PLC waveguide to the input semiconductor waveguide is not optimal, an uncoupled light may reach the end facet 3b on the opposite side thereof as a stray light depending on the structure of the semiconductor waveguide to thereby be mixed into the output side waveguide. In the present embodiment, the output semiconductor waveguide 11 has the turnaround portion 11a, the output side waveguide faces to the same end facet 3a as the input waveguide. Therefore, a stray light component is hard to return to the end facet 3a, and thus it is hard for the stray light to be mixed into the output waveguide.

Second Embodiment

Figure 5:
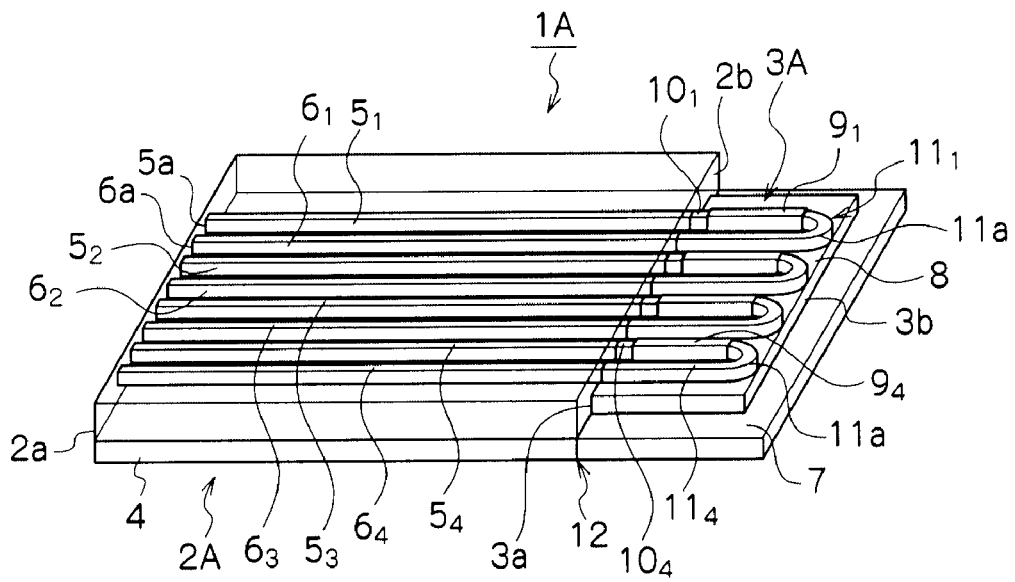
FIG. 5 is a perspective view showing a schematic configuration of an optical integrated circuit in accordance with a second embodiment.
Figure 6:
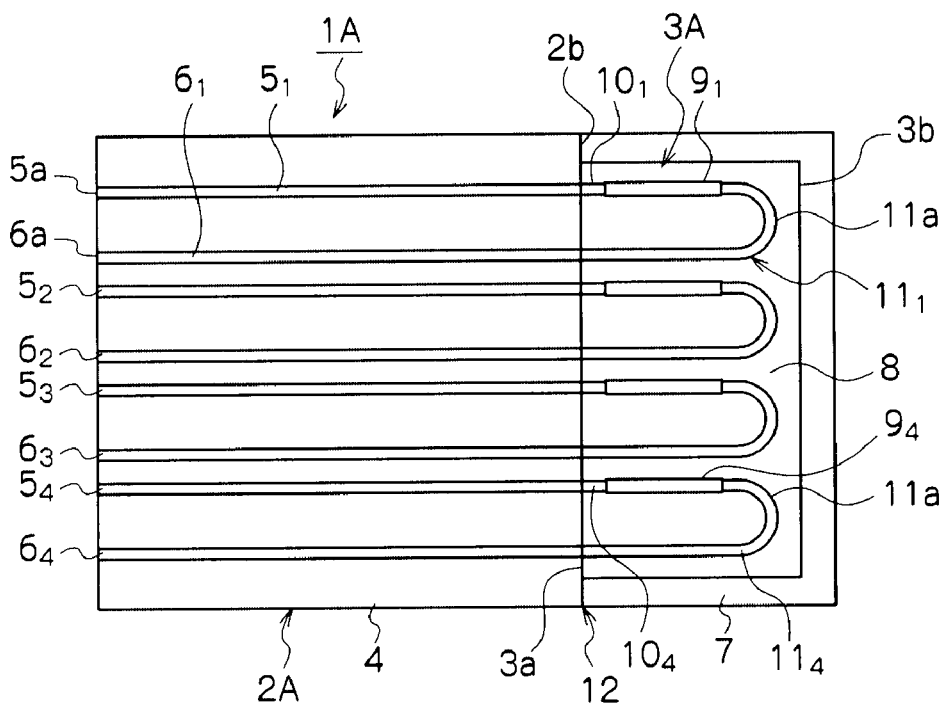
FIG. 6 is a plan view showing the optical integrated circuit in accordance with the second embodiment.

Next, an optical integrated circuit in accordance with a second embodiment will be described based on FIG. 5 and FIG. 6. FIG. 5 is a conceptual diagram showing a schematic configuration of an optical integrated circuit 1A in accordance with a second embodiment, while FIG. 6 is a plan view showing the optical integrated circuit 1A.

The optical integrated circuit 1A is characterized in that, in the optical integrated circuit 1 in accordance with the aforementioned first embodiment shown in FIG. 1, a plurality of semiconductor optical amplifiers (elements) are arranged in array pattern on the semiconductor substrate 8 of a semiconductor element 3A. As an example, four semiconductor optical amplifiers $9_1$ to $9_4$ are arranged in array pattern on the semiconductor substrate 8 as shown in FIG. 5 and FIG. 6 in the present embodiment.

Meanwhile, there are formed on the semiconductor substrate 8 the input semiconductor waveguides $10_1$ to $10_4$ and the output semiconductor waveguides $11_1$ to $11_4$ on the input side of respective semiconductor optical amplifiers $9_1$ to $9_4$ and on the output side of respective semiconductor optical amplifiers $9_1$ to $9_4$, respectively. The output semiconductor waveguides $11_1$ to $11_4$ have the turnaround portions 11a turned around on the semiconductor substrate 8, respectively. All the semiconductor waveguides $10_1$ to $10_4$ and $11_1$ to $11_4$ on the semiconductor substrate 8 are in contact with one end facet 3a of the semiconductor element 3.

Additionally, while using two straight optical waveguides 5 and 6 as one set, four sets of optical waveguides $5_1$ and $6_1$ to $5_4$ and $6_4$ are formed on the PLC platform 4 of a planar lightwave circuit 2A corresponding to all the semiconductor waveguides $10_1$ to $10_4$ and $11_1$ to $11_4$ on the semiconductor substrate 8, respectively. Four sets of optical waveguides $5_1$ and $6_1$ to $5_4$ and $6_4$ are extended from one end facet 2a to the other end facet 2b of the planar lightwave circuit 2A, respectively. Namely, one ends of the optical waveguides $5_1$ to $5_4$ and $6_1$ to $6_4$ are in contact with one end facet (left side end facet in FIG. 5) of the PLC platform 4, respectively, and the other ends thereof are in contact with the other end facet (right side end facet in FIG. 5) of the PLC platform 4, respectively.

Additionally, spot size converters (not shown) are formed in input/output portions of each of the semiconductor waveguides $10_1$ to $10_4$ and $11_1$ to $11_4$ optically coupled with each of the corresponding optical waveguides $5_1$ to $5_4$ and $6_1$ to $6_4$. By the spot size converters, it is able to increase coupling efficiency by matching the spot sizes between each of the semiconductor waveguides $10_1$ to $10_4$ and $11_1$ to $11_4$ and each of the optical waveguides $5_1$ to $5_4$ and $6_1$ to $6_4$.

Moreover, it is fabricated in order to make an optical gain in a TE mode and an optical gain in a TM mode be same with each other also for an active layer portion of each of the semiconductor optical amplifiers $9_1$ to $9_4$. By this construction, polarization independent operation can be achieved also involving the optical waveguides $5_1$ to $5_4$ and $6_1$ to $6_4$ and the semiconductor waveguides $10_1$ to $10_4$ and $11_1$ to $11_4$.

According to the second embodiment having the configurations described above, following functions and effects can be obtained in addition to the functions and effects obtained by the aforementioned first embodiment.

Even when the optical integrated circuit 1A is fabricated by integrating the semiconductor element 3A in which a plurality of semiconductor optical amplifiers $9_1$ to $9_4$ are arranged in array pattern, and the planar lightwave circuit 2A, the optical alignment works can be easily performed and excellent coupling efficiency can also be obtained.

Although there are many waveguides joined at the contact surface 12, the planar lightwave circuit 2A and the semiconductor element 3A are made contact with each other at one contact surface 12 to be fixed, so that it is possible to perform the alignment and fixing works of the planar lightwave circuit 2A and the semiconductor element 3A at once.

Since the output semiconductor waveguides $11_1$ to $11_4$ formed on the output side of each of the semiconductor optical amplifiers $9_1$ to $9_4$ have the turnaround portions $11a$, respectively, the radiuses of curvature of the turnaround portions $11a$ can be reduced, thus allowing a size of the semiconductor element 3A to be greatly reduced. Hence, the compact optical integrated circuit 1A in which the planar lightwave circuit 2A and the semiconductor element 3A are integrated can be achieved.

The spot size converters (not shown) are formed in the input/output portions of each of the semiconductor waveguides $10_1$ to $10_4$ and $11_1$ to $11_4$ coupled with each of the corresponding optical waveguides $5_1$ to $5_4$ and $6_1$ to $6_4$. By the spot size converters, the coupling efficiency can be increased by matching the spot sizes between each of the optical waveguides $10_1$ to $10_4$ and $11_1$ to $11_4$ and each of the optical waveguides $5_1$ to $5_4$ and $6_1$ to $6_4$.

Third Embodiment

Figure 7:
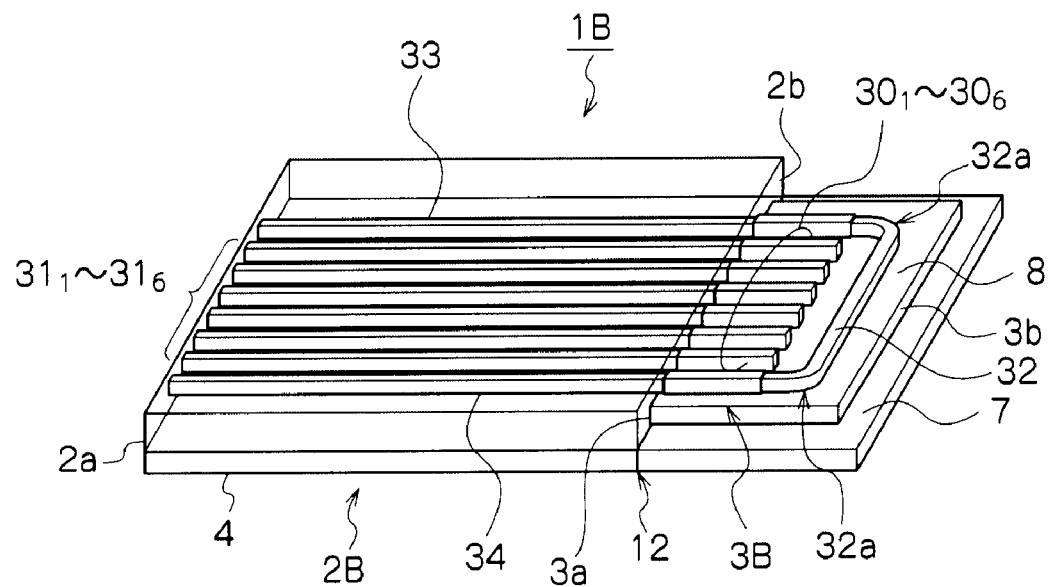
FIG. 7 is a perspective view showing a schematic configuration of an optical integrated circuit in accordance with a third embodiment.

Next, an optical integrated circuit in accordance with a third embodiment will be described based on FIG. 7. FIG. 7 is a conceptual diagram showing a schematic configuration of an optical integrated circuit 1B in accordance with the third embodiment.

The optical integrated circuit 1B is characterized by following configurations.

A semiconductor element 3B in which a plurality of waveguide-type photodiodes (elements) $30_1$ to $30_6$ are formed on the semiconductor substrate 8 in array pattern, and a planar lightwave circuit 2B in which a plurality of optical waveguides are formed are fixed at one contact surface 12 and are integrated. As an example, six waveguide photodiodes $30_1$ to $30_6$ are formed on the semiconductor substrate 8 in the present embodiment.

Six straight optical waveguides $31_1$ to $31_6$ respectively coupled with the light incidence side end facets (light receiving facets) of the waveguide photodiodes $30_1$ to $30_6$ are formed on the PLC platform 4 of the planar lightwave circuit 2B.

Each of the waveguide photodiodes $30_1$ to $30_6$ is an element with only one input and without an optical output, and each of the waveguide photodiodes $30_1$ to $30_4$ is coupled with each of the optical waveguides $31_1$ to $31_6$ only at one side. For that reason, ends of the input semiconductor waveguides inside of the waveguide photodiodes $30_1$ to $30_6$ are in contact with the end facet $3a$ of the semiconductor element 3, respectively, and are coupled with the corresponding optical waveguides $31_1$ to $31_6$ of the planar lightwave circuit 2B at the contact surface 12.

A turnaround waveguide 32 for alignment for letting a light for alignment pass is formed aside from the waveguide photodiodes $30_1$ to $30_6$ on the semiconductor substrate 8. The turnaround waveguide 32 for alignment has bent portions $32a$ at two points, and an end on the light input side and an end on the light output side thereof are in contact with the end facet $3a$ of the semiconductor element 3B, respectively.

A first optical waveguide 33 for alignment and a second optical waveguide 34 for alignment for guiding the light for alignment are formed on the PLC platform 4.

The end on the light input side and the end on the light output side of the turnaround waveguide 32 for alignment are coupled with an end of the first optical waveguide 33 for alignment and an end of the second optical waveguide 34 for alignment at the contact surface 12, respectively.

When the optical integrated circuit 1B having the configurations described above is fabricated, the active alignment similar to that of the aforementioned first embodiment is performed. In this case, when the light for alignment is entered into the first optical waveguide 33 for alignment, the light will be emitted from the second optical waveguide 34 for alignment passing through the turnaround waveguide 32 for alignment and the second optical waveguide 34 for alignment. The output light is received by a light receiving element (not shown), a relative position between the planar lightwave circuit 2B and the semiconductor element 3B is adjusted so that the amount of light received may be the maximum level, and both of them are then fixed at the contact surface 12.

According to the third embodiment having the configurations described above, following functions and effects can be obtained in addition to the functions and effects obtained by the aforementioned first embodiment. The space between waveguides both in the semiconductor substrate 8 and in the PLC platform 4 is formed with very high accuracy. Therefore, by optimizing coupling efficiency between the turnaround waveguides 32 for alignment and the corresponding optical waveguides 33 and 34 for alignment on the PLC platform 4 by the aforementioned active alignment, it allows also the coupling between the waveguide photodiodes $30_1$ to $30_6$ and the corresponding optical waveguides $31_1$ to $31_6$ to be simultaneously optimized.

Fourth Embodiment

Figure 8:
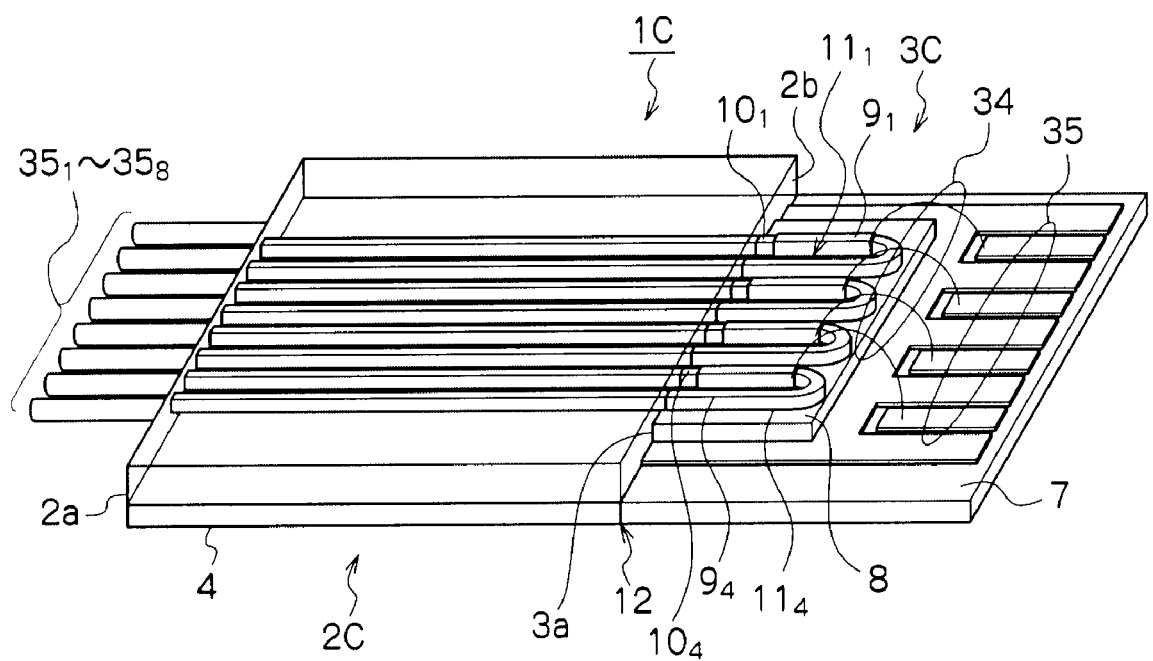
FIG. 8 is a perspective view showing a schematic configuration of an optical integrated circuit in accordance with a fourth embodiment.

Next, an optical integrated circuit module 1C in accordance with a fourth embodiment will be described based on FIG. 8. FIG. 8 is a conceptual diagram showing a schematic configuration of the optical integrated circuit module 1C in accordance with the fourth embodiment.

The optical integrated circuit module 1C is characterized by following configurations.

In the aforementioned second embodiment shown in FIG. 5, RF electrodes 55 for supplying RF signals to the semiconductor optical amplifiers $9_1$ to $9_4$ are formed on the silicon substrate 7 composing the semiconductor substrate together with the semiconductor substrate 8. The RF signals can be individually inputted into respective semiconductor optical amplifiers $9_1$ to $9_4$ from the RF electrodes 55 via wires 54.

A fiber array composed of optical fibers $35_1$ to $35_8$ for input/output coupled with one ends of the optical waveguides $5_1$ to $5_4$ and $6_1$ to $6_4$, respectively, is connected to an end facet (one end facet 2a of the planar lightwave circuit 2) opposite to the contact surface 12 of the PLC platform 4.

According to the fourth embodiment having the configurations described above, following functions and effects can be obtained in addition to the functions and effects obtained by the aforementioned second embodiment. The propagating direction of light is turned around at the turnaround portion 11a of each of the output semiconductor waveguides $11_1$ to $11_4$ formed on the semiconductor substrate 8, so that connection between the planar lightwave circuit 2A and the optical fibers $35_1$ to $35_8$ can also be made only by one end facet (one end facet 2a of the planar lightwave circuit 2A), thus allowing also the alignment and joint works between the planar lightwave circuit 2C and the optical fibers $35_1$ to $35_8$ to be performed at once.

Since joint of the waveguides between the planar lightwave circuit 2C and the semiconductor element 3C can be made only at the end facet 3a of the semiconductor element 3C (end facet of one side of the silicon substrate 7), an electrode setting space can be formed on a side where the semiconductor element 3C is not fixed with the planar lightwave circuit 2A to thereby provide the RF electrodes 55 in this space. As a result of this, it is very effective in driving the semiconductor optical amplifiers $9_1$ to $9_4$ at high speed.

Fifth Embodiment

Figure 9:
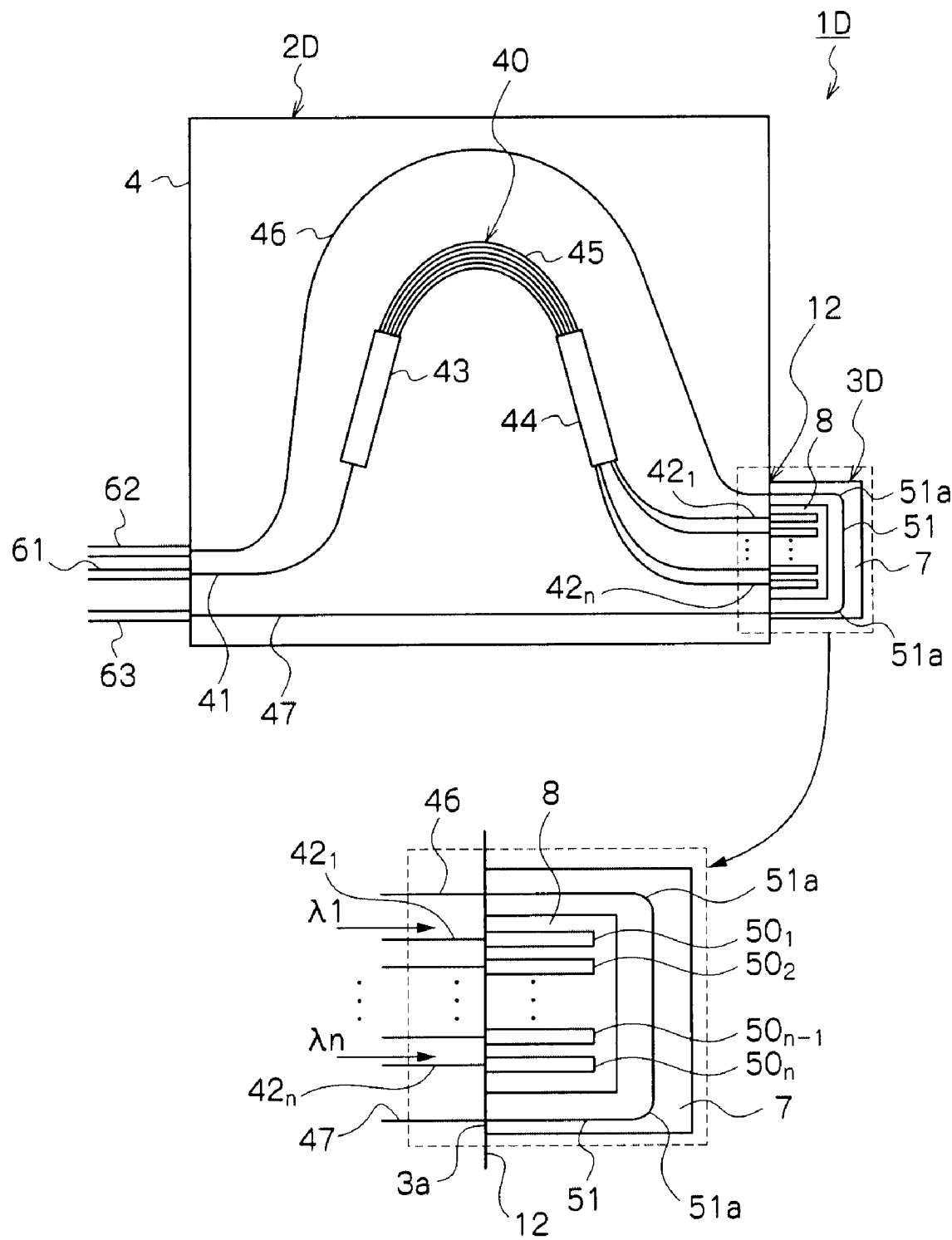
FIG. 9 is a plan view showing a schematic configuration of an optical integrated circuit in accordance with a fifth embodiment.

Next, an optical integrated circuit module 1D in accordance with a fifth embodiment will be described based on FIG. 9. FIG. 9 is a conceptual diagram showing a schematic configuration of the optical integrated circuit module 1D in accordance with the fifth embodiment.

The optical integrated circuit module 1D is characterized by following configurations.

A planar lightwave circuit 2D in which an arrayed waveguide grating (AWG) 40 is formed on the PLC platform 4, and a semiconductor element 3D in which a plurality of light receiving elements $50_1$ to $50_n$ of semiconductor waveguide type (N pieces) are formed on the semiconductor substrate 8 are fixed at one contact surface 12 and are integrated. The waveguide photodiodes $50_1$ to $50_n$ have a configuration similar to that of the aforementioned waveguide photodiodes $30_1$ to $30_6$ shown in FIG. 7.

The arrayed waveguide grating (AWG) 40 is composed of one input waveguide 41, a group of n output waveguides $42_1$ to $42_n$, an input side slab waveguide 43, an output side slab waveguide 44, and an arrayed waveguide 45.

Each of the waveguide photodiodes $50_1$ to $50_n$ is an element with only one input and without an optical output, and each of the waveguide photodiodes $50_1$ to $50_n$ is coupled with each of the optical waveguides $42_1$ to $42_n$ only at one side. For that reason, ends inside the waveguide photodiodes $50_1$ to $50_n$ are in contact with the end facet 3a of the semiconductor element 3D, respectively, and are coupled with the group of the corresponding output waveguides $42_1$ to $42_n$ of the planar lightwave circuit 2D at the contact surface 12.

A turnaround waveguide 51 for alignment for letting a light for alignment pass is formed aside from the waveguide photodiodes $50_1$ to $50_n$ on the semiconductor substrate 8. The turnaround waveguide 51 for alignment has bent portions 51a at two points, and an end on the light input side and an end on the light output side thereof are in contact with the end facet 3a of the semiconductor element 3D, respectively.

A first optical waveguide 46 for alignment and a second optical waveguide 47 for alignment for guiding the light for alignment are formed on the PLC platform 4.

The end on the light input side and the end on the light output side of the turnaround waveguide 51 for alignment are coupled with an end of the first optical waveguide 46 for alignment and an end of the second optical waveguide 47 for alignment at the contact surface 12, respectively.

Optical fibers 61, 62, and 63 are connected to an end of the input waveguide 41 of the arrayed waveguide grating (AWG) 40, the other end of the first optical waveguide 46 for alignment, and the other end of the second optical waveguide 47 for alignment, respectively.

In the optical integrated circuit module 1D, the arrayed waveguide grating 40 is used as a splitter. When the optical integrated circuit module 1D having the configuration described above is fabricated, the active alignment similar to that of the aforementioned third embodiment shown in FIG. 7 is performed. In this case, when a light for alignment is entered into the first optical waveguide 46 for alignment from the optical fiber 62, the light will be emitted from the optical fiber 63 passing through the turnaround waveguide 51 for alignment and the second optical waveguide 47 for alignment. The output light is received by a light receiving element (not shown), a relative position between the planar lightwave circuit 2D and the semiconductor element 3D is adjusted so that the amount of light received may be the maximum level, and both of them are fixed at the contact surface 12.

According to the fifth embodiment having the configurations described above, following functions and effects can be obtained in addition to the functions and effects obtained by the aforementioned first embodiment. The space between waveguides both in the semiconductor substrate 8 and in the PLC platform 4 is formed with very high accuracy. For this reason, by optimizing coupling efficiency between the turnaround waveguides 51 for alignment and the corresponding optical waveguides 46 and 47 for alignment on the PLC platform 4 by the aforementioned active alignment, it allows also the coupling between the waveguide photodiodes $50_1$ to $50_n$ and the output waveguide groups $42_1$ to $42_n$ of the corresponding arrayed waveguide grating 40 to be simultaneously optimized.

Incidentally, the present invention can also be embodied by being changed as follows.

Although the turnaround portion 11a is formed in the output semiconductor waveguide 11 in the aforementioned first embodiment shown in FIG. 1, the present invention is applicable also to a configuration in which the turnaround portion is formed in the semiconductor waveguide 10 on the input side. Similar effects may be obtained also by this configuration.

The present invention is applicable also to an optical integrated circuit module in which, in the aforementioned first, second, and third embodiments shown in FIG. 1, FIG. 5, and FIG. 7, the input/output optical fiber is connected to each of the optical waveguides of the planar lightwave circuit.

The present invention is applicable also to an optical integrated circuit in which, in the aforementioned third and fifth embodiments shown in FIG. 7 and FIG. 9, the semiconductor light emitting elements (elements), such as a plurality of semiconductor laser diode are formed in array pattern on the semiconductor substrate, instead of the plurality of waveguide photodiodes $30_1$ to $30_6$ and $50_1$ to $50_n$. When the semiconductor light emitting elements are used as the elements, it is also possible to perform the active alignment while making those semiconductor light emitting elements emit light. In this case, it is not necessary to form the turnaround waveguide 32 for alignment on the semiconductor substrate 8, and it is not necessary to form the optical waveguides 33 and 34 for alignment also on the PLC platform 4, either.

Although the arrayed waveguide grating (AWG) 40 is used as a splitter in the aforementioned fifth embodiment shown in FIG. 9, the present invention is applicable also to an optical integrated circuit or an optical integrated circuit module in which the arrayed waveguide grating 40 is used as an optical multiplexer. The present invention is applicable also to an optical integrated circuit or an optical integrated circuit module, in which a semiconductor element in which a plurality of semiconductor light emitting elements and a plurality of Electro Absorption (EA) modulators utilizing the electric field absorption effect of the semiconductor are arranged in array pattern on the semiconductor substrate of the semiconductor element, and a planar lightwave circuit are fixed at one contact surface, for example.

The present invention is not limited to the above-described embodiments and various and modifications may be possible without departing from the scope of the present invention.

This application is based on the Japanese Patent application No. 2007-091594 filed on Mar. 30, 2007, entire content of which is expressly incorporated by reference herein.

What is claimed is:

1. An optical integrated circuit comprising:
   a planar lightwave circuit in which an optical waveguide is formed on a first substrate; and
   a semiconductor element in which at least one element having a semiconductor waveguide is formed on a second substrate, wherein the planar lightwave circuit and the semiconductor element are fixed at one contact surface, and an end of the optical waveguide and an end of the semiconductor waveguide are optically coupled with each other at the contact surface, and
   an input semiconductor waveguide and an output semiconductor waveguide are formed at an input side and an output side of the element having the semiconductor waveguide, respectively, one of the input and the output semiconductor waveguides has a turnaround portion turned around on the second substrate, and an end of the input semiconductor waveguide and an end of the output semiconductor waveguide are optically coupled at the contact surface with an end of an input side optical waveguide and an end of an output side optical waveguide formed on the first substrate, respectively.

2. The optical integrated circuit according to claim 1, wherein a plurality of elements having the semiconductor waveguides are arranged in array pattern.

3. The optical integrated circuit according to claim 2, wherein ends of all the semiconductor waveguides formed on the second substrate and ends of all the optical waveguides formed on the first substrate are optically coupled with each other at the contact surface.

4. The optical integrated circuit according to claim 3, wherein RF electrodes for supplying RF signals to the elements are formed on the second substrate.

5. An optical integrated circuit comprising:
   a planar lightwave circuit in which an optical waveguide is formed on a first substrate; and
   a semiconductor element in which at least one element having a semiconductor waveguide is formed on a second substrate, wherein the planar lightwave circuit and the semiconductor element are fixed at one contact surface, and an end of the optical waveguide and an end of the semiconductor waveguide are optically coupled with each other at the contact surface, and
   the element having the semiconductor waveguide is a semiconductor light receiving element in which the input semiconductor waveguide is formed only on the input side thereof, the end of the input semiconductor waveguide is optically coupled with the optical waveguide at the contact surface, a first optical waveguide for alignment and a second optical waveguide for alignment for guiding a light for alignment are formed on the first substrate, a turnaround waveguide for alignment is formed on the second substrate, and a light emitting end of the first optical waveguide for alignment and a light incident end of the second optical waveguide for alignment are optically coupled with a light incident end and a light emitting end of the turnaround waveguide for alignment at the contact surface, respectively.

6. The optical integrated circuit according to claim 5, wherein the elements are arranged in array pattern.

* * * * *